United States Patent [19]

Graham

[11] Patent Number: 4,808,147
[45] Date of Patent: Feb. 28, 1989

[54] ADJUSTABLE BOTTOM BRACKET ASSEMBLY FOR BICYCLES

[75] Inventor: David Graham, Danbury, Conn.
[73] Assignee: Cannondale Corporation, Georgetown, Conn.
[21] Appl. No.: 57,755
[22] Filed: Jun. 3, 1987
[51] Int. Cl.⁴ .......................... F16H 7/10; F16C 35/00
[52] U.S. Cl. ...................................... 474/112; 384/431; 384/458
[58] Field of Search ...................... 74/594.2, 570, 600, 74/594.1; 474/112; 384/255, 267, 538, , 262, 271, 431, 545, 458, 429; 403/374, 16, 370, 297, 369, 358, 409.1

[56] References Cited

U.S. PATENT DOCUMENTS

| | | | |
|---|---|---|---|
| 697,944 | 4/1902 | Johnson | 384/431 |
| 2,280,662 | 4/1942 | Pawsat | 403/370 |
| 2,676,063 | 4/1954 | Whitt | 403/370 X |
| 3,918,779 | 11/1975 | Halliger et al. | 403/374 X |
| 4,009,742 | 3/1977 | Ziegelmeyer | 407/49 X |
| 4,539,861 | 9/1985 | Nishikawa | 403/374 X |

FOREIGN PATENT DOCUMENTS

| | | | |
|---|---|---|---|
| 85183 | 2/1896 | Fed. Rep. of Germany | 474/112 |
| 124843 | 11/1901 | Fed. Rep. of Germany | 474/112 |
| 1233665 | 2/1967 | Fed. Rep. of Germany | 384/585 |
| 1446907 | 6/1966 | France | 384/585 |
| 23321 | of 1897 | United Kingdom | 474/112 |

*Primary Examiner*—Gary L. Smith
*Assistant Examiner*—Rodney M. Lindsey
*Attorney, Agent, or Firm*—Brumbaugh, Graves, Donohue & Raymond

[57] ABSTRACT

An adjustable bottom bracket assembly for a bicycle comprises a body member and a wedge member, each having a circular cylindrical external surface in close fit with an internal circular cylindrical surface of a bottom bracket shell. The body and wedge members have abutting complementary planar wedge surfaces oriented obliquely to the axes of their cylindrical surfaces. A drive device, such as a screw, moves the body and wedge members axially to wedge them securely in an adjusted position in the bottom bracket shell.

4 Claims, 1 Drawing Sheet

ADJUSTABLE BOTTOM BRACKET ASSEMBLY FOR BICYCLES

BACKGROUND OF THE INVENTION

The front and rear driving sprockets of tandem bicycles are coupled by a chain. Because it is, first, impractical to use high precision in the various components of the bicycle involved in providing the proper tension in the chain and, second, lack of adjustment capability in the chain tension would make it difficult to install the chain, it is well-known and conventional to provide for fore and aft adjustment of the rotational axis of the front pedal crank spindle, on which the front driving sprocket is mounted. Among the adjusting devices known for this purpose are eccentric mounts in which the rotary axis of the spindle is eccentric to a cylindrical casing that is rotatable among adjusted positions in a shell. The shell is arranged in some way to hold the casing in the adjusted position.

One arrangement for fixing the eccentric in the adjusted position is to use a split shell and two binder blocks, which tighten the shell to clamp the spindle casing in the adjusted position. This design is similar to the way in which the heights of bicycle seat posts are adjustably changed within the seat tube. Another known arrangement is based on a set screw concept. Both the binder block and set screw designs involve components external to the shell that detract from the appearance of the assembly, as compared to a conventional bottom bracket assembly, and both require extra manufacturing operations, which increase labor costs, such as the costs of splitting the shell and welding or brazing on fittings.

SUMMARY OF THE INVENTION

There is provided, in accordance with the present invention, an adjustable bottom bracket assembly for a bicycle which is based, as is known per se, on an eccentrically mounted spindle rotatably adjusted in a sleeve but which has no unsightly external elements and does not require extra labor or undue complexity for manufacture and installation. The assembly of the invention is easy to adjust, durable, and reliable. A preferred use of the assembly is for the front bottom bracket of a tandem bicycle to enable adjustment of the chain that couples the front and rear driving sprockets. In this use the rear bottom bracket assembly provides a fixed axis of rotation for the rear pedal crank spindle, and the rear wheel dropouts enable adjustment of the main driving chain tension. An alternative use of the invention is in the rear bottom bracket assembly, in which case the front bottom bracket assembly provides a fixed axis of rotation for the front pedal crank spindle. The invention can also be used in single-rider bicycles and in both bottom brackets of tandem bicycles.

According to the invention a bottom bracket assembly includes a tubular shell having a circular cylindrical internal surface. An eccentric body member having an external outer circular cylindrical surface in close fit with the internal surface of the shell over a major portion thereof and a planar wedge external surface disposed obliquely to the axis of said cylindrical surface is received in the shell. The body member has a bore eccentric to said cylindrical surface and is adapted to receive journal means for rotatably supporting the pedal crank spindle. A wedge member having an external circular cylindrical surface having a close fit to the internal surface of the shell and a wedge surface complementary to and engageable with the wedge external surface of the body is received in the shell adjacent the body member. A drive arrangement couples the body and wedge members to each other and moves one wedge surface axially of the other in opposite directions selectively to loosen the body member for adjustable rotation in the shell and tighten the body member in clamped relation to the shell in a selected adjusted position of the eccentric spindle axis.

The drive arrangement, preferably, includes a screw having a threaded portion in driving relation with one of the members and a head portion in engaging relation with the other member. In a preferred embodiment the threaded portion of the screw is in threaded relation to a barrel nut received by the wedge member.

For a better understanding of the invention reference may be made to the following description of an exemplary embodiment, taken in conjunction with the accompanying drawing.

DESCRIPTION OF THE EMBODIMENT

Figure 1:
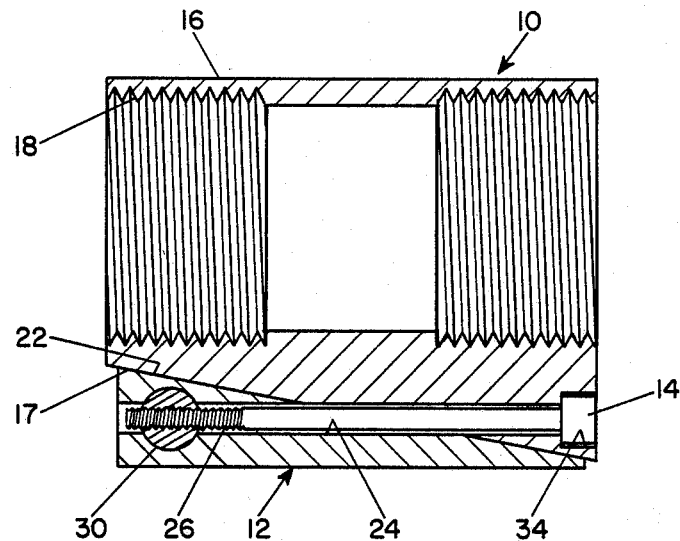
FIG. 1 is a side cross-sectional view taken along a plane that includes the axes of the spindle and the eccentric body member.
Figure 2:
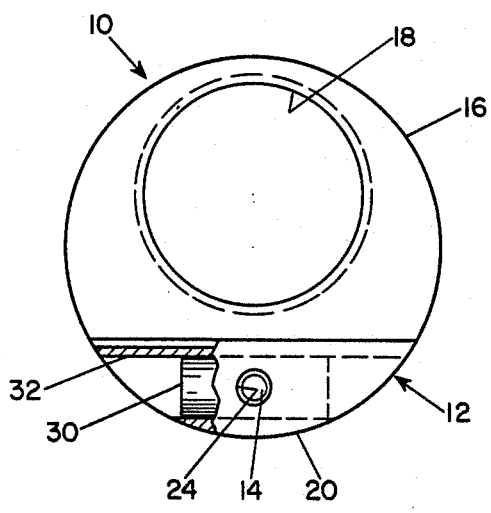
FIG. 2 is an elevational view of the left end of the embodiment, to FIG. 1.
Figure 3:
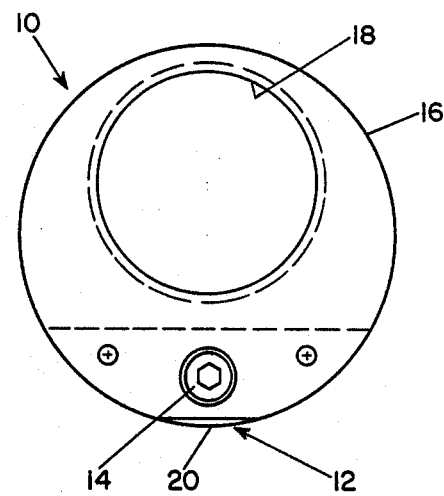
FIG. 3 is an elevational view of the right end of the embodiment, also with respect to FIG. 1.

For simplicity and clarity the drawings do not show the bottom bracket shell, which is part of the bicycle frame and is a housing for the components of the assembly shown in the drawing. Consistent with the rotational adjustment of the assembly, a shell for use with the invention has a circular cylindrical internal surface. Conventional designs for bottom bracket shells and their manner of assembly in a bicycle frame are well-known. Unlike previously known arrangements for eccentric spindles, the shell suitable for the present invention has no fittings or characteristics involved in adjusting and affixing the spindle axis, apart from presenting an internal circular cylindrical surface of a suitable diameter.

The assembly of the invention, according to the embodiment, comprises a body member 10, a wedge member 12 and drive means, such as a screw 14, for moving the members in opposite directions relative to each other between a configuration that enables the members to be rotated in the shell about the axis of the shell internal surface and a configuration in which the wedge member wedges the body member into clamped relation in firm, non-rotatable engagement with the shell internal surface.

Over its major portion the body member has a circular cylindrical external surface 16 that is in close fit with the internal surface of the shell. Enough clearance is provided, however, to enable the body 10 to be rotated in the shell. A nominal clearance of about 0.005 to 0.010 inch is suitable. A close fit is desirable to ensure a broad band of compressive contact between the body and shell for frictional resistance to slipping from the correctly adjusted position. The remainder of the external perimeter surface of the body 10 is a flat wedge surface 17 that is oriented obliquely to the axis of the cylindrical surface. Preferably, the wedge surface extends the full length of the body to distribute the clamping load reasonably uniformly along the lengths of both the body and wedge members. Also, it is desirable, within the constraints of providing sufficient strength and durability, to minimize the overall diameter of the body 10. The desired eccentricity of the spindle, which can be about ¼ to 5/16 inch, and a minimum wall thickness in any part of the body suggest a nominal diameter of about 2⅛ inch. The wedge angle will be largely dictated by the length of the body and the minimum wall thickness desired in any part of either the body or wedge member. For the 2⅛ inch diameter example and a length of about 2⅝ inch a wedge angle of about 11° is suitable.

The body has a bore 18 threaded at either end to receive the spindle bushings, which may be of a conventional design. The axis of the bore is parallel to the axis of the cylindrical external surface of the body, is offset (eccentric) by the desired amount, and lies in a plane perpendicular to the wedge surface, which provides geometric symmetry about the plane of the two axes for even load distribution.

The wedge member 12 has a circular cylindrical external surface 20 of the same diameter as that of the body and a wedge surface 22 that is complementary to that of the body. A bore 24 parallel to the axis of the cylindrical surface accepts the threaded end 26 of a socket head cap screw 14. To minimize the possibility of misalignment between the wedge member and the shell when the screw is tightened, a barrel nut 30 installed in a transverse bore 32 in the wedge member receives the screw threads. The head end of the screw 14 is received in a counter sunk bore 34 in the body member 10.

With the screw 14 loosened to shift the wedge member 12 to the left sufficiently to provide clearance between the surfaces of the wedge and body members and the internal surface of the bottom bracket shell, the assembly can be rotated to adjust properly the tension in the chain. When the screw 14 is turned to draw the wedge from left to right, relative to FIG. 1, the wedge surfaces drive the wedge and body members diametrically away from each other and clamp them tightly against the shell. For readjustment, loosening the screw will probably not alone drive the wedge member away, but the wedge member can be freed by tapping the head of the backed-off screw. This release operation makes it preferable for the screw threads to work against the wedge member rather than the body member.

I claim:

1. A bottom bracket assembly for a bicycle comprising
   an eccentric body member having an external outer circular cylindrical surface adapted to be received in close fit with an internal circular cylindrical surface of a tubular shell over a major portion thereof and a planar wedge external surface disposed orthogonally to a plane that includes the axis of said external outer circular cylindrical surface and obliquely to the axis of said cylindrical surface and axially coextensive with said cylindrical surface, the body member further including a bore having an axis parallel to and spaced apart from the axis of said cylindrical surface and adapted to receive journal means for rotatably supporting a pedal crank spindle;
   a wedge member having an external circular cylindrical surface adapted to be received with a close fit to the internal surface of the shell and a wedge surface complementary to, substantially coextensive with and engageable with the wedge external surface of the body member;
   and drive means coupling the body and wedge members to each other for moving one wedge surface axially of the other in opposite directions selectively to loosen the body member for adjustable rotation in the shell and tighten the body member in clamped relation to the shell in a selected adjusted position of the pedal crank spindle.

2. An assembly according to claim 1 wherein the drive means includes a screw having a threaded portion adapted to be coupled in driving relation to one of the members and a head portion in engaging relation with the other member.

3. An assembly according to claim 2 wherein the threaded portion of the screw is in threaded relation to a barrel nut received by said one member.

4. An assembly according to claim 3 wherein the barrel nut is received by the wedge member.

* * * * *